(12) United States Patent
Best et al.

(10) Patent No.: US 8,645,432 B2
(45) Date of Patent: Feb. 4, 2014

(54) METHOD AND DEVICE FOR CUSTOMIZING A MAIL HISTORY

(75) Inventors: Steven F. Best, Acton, MA (US); Xiang Yu Hao, Beijing (CN); Yue Ma, Beijing (CN); Min Qu, Beijing (CN); Meng Xin Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/423,586

(22) Filed: Mar. 19, 2012

(65) Prior Publication Data

US 2012/0191759 A1    Jul. 26, 2012

Related U.S. Application Data

(63) Continuation of application No. 12/259,415, filed on Oct. 28, 2008, now Pat. No. 8,244,776.

(30) Foreign Application Priority Data

Nov. 30, 2007    (CN) .......................... 2007 1 0196261

(51) Int. Cl.
    *G06F 17/30*    (2006.01)
(52) U.S. Cl.
    CPC ............................... *G06F 17/30286* (2013.01)
    USPC ............................ 707/802; 707/609; 709/206
(58) Field of Classification Search
    USPC ........... 707/609, 723, 748, 802, 810; 709/206
    See application file for complete search history.

(56) References Cited

U.S. PATENT DOCUMENTS

| | | | |
|---|---|---|---|
| 6,570,555 B1 | 5/2003 | Prevost et al. | |
| 6,609,138 B1 | 8/2003 | Merriam | |
| 6,816,175 B1 * | 11/2004 | Hamp et al. | 715/854 |
| 6,816,885 B1 | 11/2004 | Raghunandan | |
| 7,120,622 B2 * | 10/2006 | Zellweger et al. | 707/805 |
| 7,133,851 B1 | 11/2006 | Benson | |
| 7,181,438 B1 * | 2/2007 | Szabo | 707/669 |
| 7,181,445 B2 * | 2/2007 | Bebo et al. | 707/669 |
| 7,426,541 B2 | 9/2008 | McCown | |
| 7,693,957 B2 | 4/2010 | Matsusaka | |
| 7,747,650 B2 * | 6/2010 | Zellweger et al. | 707/793 |
| 7,801,896 B2 * | 9/2010 | Szabo | 707/739 |

(Continued)

OTHER PUBLICATIONS

Shahid Al Alam, USPTO Office Action, U.S. Appl. No. 12/259,415, Notification Date Jan. 23, 2012, 13 pages.

(Continued)

*Primary Examiner* — Shahid Alam
(74) *Attorney, Agent, or Firm* — Jeff Tang; Hoffman Warnick LLC

(57) ABSTRACT

A method for customizing a mail history including generating a mail tree composed of all received mails belonging to a same topic; receiving a user input indicating a mail to be replied to and a mail to be referred to which are selected by the user, the mail to be replied to and the mail to be referred to being located on different branches of the mail tree; acquiring a first plurality of mails on a first path from a root mail of the mail tree to a child mail of the mail to be replied to, and a second plurality of mails on a second path from the root mail to a child mail of the mail to be referred to; and merging the first plurality of mails and the second plurality of mails to generate a merging result as the mail history.

19 Claims, 9 Drawing Sheets

(56) References Cited

U.S. PATENT DOCUMENTS

| | | |
|---|---|---|
| 2002/0169835 A1 | 11/2002 | Paul et al. |
| 2003/0208608 A1 | 11/2003 | Merriam |
| 2004/0044746 A1 | 3/2004 | Matsusaka |
| 2004/0199595 A1 | 10/2004 | Banister et al. |
| 2006/0053200 A1 | 3/2006 | McCown |

OTHER PUBLICATIONS

Shahid Al Alam, USPTO Notice of Allowance and Fee(s) Due, U.S. Appl. No. 12/259,415, Date Mailed Apr. 3, 2012, 5 pages.

* cited by examiner (a)

(b)

METHOD AND DEVICE FOR CUSTOMIZING A MAIL HISTORY

This application is a continuation application of co-pending U.S. patent application Ser. No. 12/259,415, filed on Oct. 28, 2008, which is hereby incorporated herein.

FIELD OF THE INVENTION

The present invention relates to a method and device for customizing a mail history, and more particularly, relates to a method and device for customizing a mail history so that when a user replies to a current mail, the user can refer to a mail on a different branch of a same mail tree or a mail on a different mail tree.

RELATED ART

An e-mail system plays an important role in an enterprise by connecting all employees, and almost all information flows in the mail system. Therefore, using the e-mail system efficiently will greatly increase the working efficiency of the enterprise and thus bring higher revenue to the enterprise.

Currently, many e-mail systems, such as the Lotus Notes® Mail System, can support organizing and managing related mails in a mail tree view, e.g., a thread in the Lotus Notes® Mail System. When a mail client of this kind of mail system receives mails from other users, for those mails belonging to a same topic which are generated by replying or forwarding operations, the mail client can generate a mail tree composed of the mails based on information reflecting heritage relationships among the mails and display these mails in a tree view, since the information has been added into the mails at the time of the replying or forwarding operations. In the mail tree, the mail initiating the topic is a root mail, i.e., a root node, and the other mails respectively become intermediate nodes or leaf nodes according to the heritage relationships.

When a topic is discussed by using a mail system, a case in which a user directly replies to a last received mail, whereas another user replies to an intermediate mail in which the user is interested instead of a last mail, often occurs. This results in multiple branches being generated in the mail tree. FIG. 1 schematically shows an exemplary mail tree generated in a mail system supporting a mail tree view, which comprises multiple branches.

Generally, options, such as "Reply", "Reply to all", "Reply with history", "Reply to all with history", and the like, are provided in a mail client. When a user browses a mail and wants to reply to the mail, the user can select one of the above-mentioned options. For example, if the user replies to the current mail by selecting the option of "Reply with history", a mail history of the current mail will be automatically attached into a new mail as the reply, and the mail history includes contents of a history mail on a branch where the current mail is located.

However, there is not an efficient way that enables a user to directly refer to contents of a mail on another branch when replying to a mail on a branch in conventional mail systems, that is, when the user wants to directly refer to the mail on another branch when replying to the current mail. Since conventional mail systems cannot provide this functionality, the user often solves this problem by adopting two approaches as follows. In a first approach, the user finds the mail on another branch, copies the contents to which the user wants to refer and pastes the contents into a new mail. However, in this approach, the user has to find the mail first, filter all undesired contents from all the history of the mail, and then copy and paste the desired contents, which requires much time and is inconvenient.

In a second approach, the user first replies to the current mail and tells the receiver that "I'll forward you some other discussions about the contents, please check mails". Then, the user selects mails to which the user wants to refer one by one and forwards them to the receiver. In this approach, however, the user has to find all of the mails to which the wants to refer, copy the receiver's address as the forwarding address into respective mails one by one, and then forward the mails to the receiver. To this extent, such a process also needs much time and is troublesome (especially when there are many mails to be referred to). Moreover, such a two-step-operation approach may bring inconvenience to the receiver and break the integrity of opinions the user wants to express.

In addition, conventional mail systems do not provide an efficient way that enables the user to directly refer to other mail belonging to a different topic, i.e., a mail on a mail tree different from the mail tree to which the current mail belongs) when replying to the current mail.

Therefore, there is a need for a method and a device that can automatically generate a mail history of a new mail as a reply according to a selection of a user, so that when replying to a current mail, the user can directly refer to a mail on a different branch of a same mail tree or a mail on a different mail tree.

SUMMARY OF THE INVENTION

The present invention provides a method and device for customizing a mail history, which can automatically merge history information of mails on different branches of a same mail tree according to a selection of a user, so as to generate history information of a new mail as a reply. The present invention also provides a method for customizing a mail history, which can automatically merge history information of mails on different mail trees according to a selection of a user, so as to generate history information of a new mail.

According to an aspect of the present invention, there is provided a method for customizing a mail history, the method comprising: generating a mail tree composed of all received mails belonging to a same topic; receiving a user input indicating a mail to be replied to and a mail to be referred to which are selected by the user, the mail to be replied to and the mail to be referred to being located on different branches of the mail tree; acquiring a first plurality of mails on a first path from a root mail of the mail tree to a child mail of the mail to be replied to, and a second plurality of mails on a second path from the root mail to a child mail of the mail to be referred to; and merging the first plurality of mails and the second plurality of mails to generate a merging result as the mail history.

According to another aspect of the present invention, there is provided a device for customizing a mail history, the device comprising: generating means for generating a mail tree composed of all received mails belonging to a same topic; receiving means for receiving a user input indicating a mail to be replied to and a mail to be referred to which are selected by the user, the mail to be replied to and the mail to be referred to being located on different branches of the mail tree; acquiring means for acquiring a first plurality of mails on a first path from a root mail of the mail tree to a child mail of the mail to be replied to, and a second plurality of mails on a second path from the root mail to a child mail of the mail to be referred to; and merging means for merging the first plurality of mails and the second plurality of mails to generate a merging result as the mail history.

According to still another aspect of the present invention, there is provided a method for customizing a mail history, the method comprising: generating a first mail tree composed of all received mails belonging to a first topic, and generating a second mail tree composed of all received mails belonging to a second topic; receiving a user input indicating a mail to be replied to which is selected by the user in the first mail tree and a mail to be referred to which is selected by the user in the second mail tree; acquiring a first plurality of mails on a first path from a root mail of the first mail tree to a child mail of the mail to be replied to in the first mail tree, and acquiring a second plurality of mails on a second path from a root mail of the second mail tree to a child mail of the mail to be referred to in the second mail tree; merging the first plurality of mails and the second plurality of mails to generate a merging result as the mail history.

With the above methods and device, when replying to a current mail, a user can conveniently refer to information of a mail on a different branch of a same mail tree or information of a mail on a different mail tree, thereby improving the efficiency of the mail system. In addition, by customizing the mail history as described above, the present invention can also provide the user with a new view including the customized mail history so that the user can clearly and comprehensively grasp a complete discussion history of a topic.

DETAILED DESCRIPTION OF THE INVENTION

Figure 1:
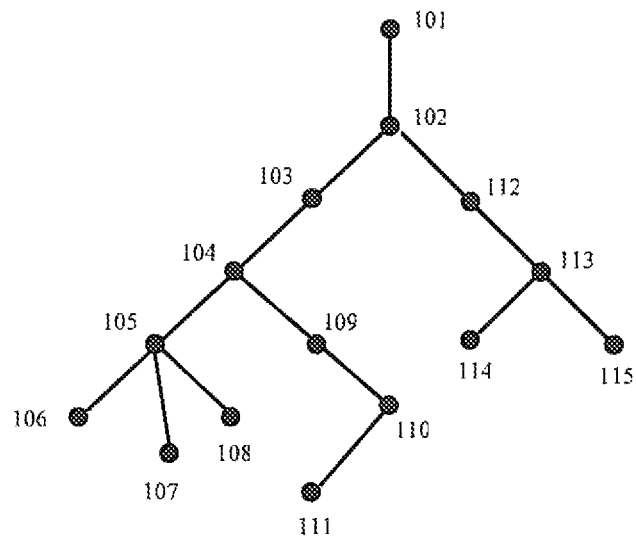
FIG. 1 schematically shows an exemplary mail tree generated in a mail system supporting a mail tree view.

As described above, a mail client of a mail system which supports a mail tree view organizes and manages received mails by using a mail tree. For example, the mail tree shown in FIG. 1 can represent the following exemplary mail exchange process. At first, the mail client receives a mail 101 initiating a topic, which corresponds to a root node (i.e., a root mail) 101 of the mail tree. Then, the mail client receives a mail 102 which is a reply of another user to the mail 101 and corresponds to a node 102. Next, the mail client receives a mail 103 and a mail 112 which are replies of other users to the mail 102 and correspond to a node 103 and a node 112, respectively. The mail 103 and the mail 112 are on different branches, because they are replies made to the same mail 102 by different users. In the process of discussing the topic, the respective users may reply to or forward different mails, thus the mail tree grows downwards from the root mail (the root node) to have multiple branches. When replying to or forwarding a mail, the mail client automatically add information reflecting a heritage relationship between a new generated mail and its parent mail (corresponding to its parent node in the mail tree) into the generated new mail, and the mail system can generate the mail tree based on the heritage information. The process for the mail system to generate the mail tree is well known in the art, and the description thereof is omitted for simplicity.

The mail system can determine an accurate path of a mail in the mail tree based on the heritage information included in the mail. This makes it possible to traverse the mail tree in a specific order and filter redundant information, for example, prevent contents of the root mail or other mails from appearing in the customized mail history more than once.

Figure 2:
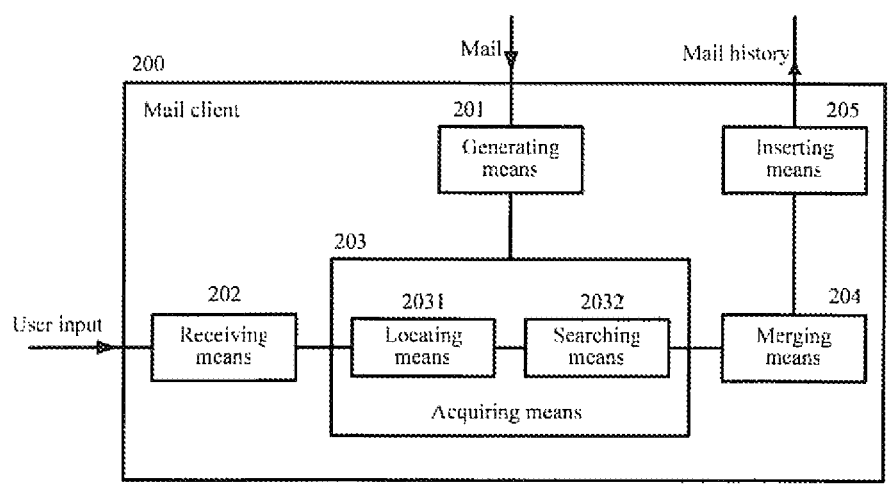
FIG. 2 is a block diagram showing a device for customizing a mail history according to a first embodiment of the present invention.

Hereinafter, a device for customizing a mail history according to a first embodiment of the present invention will be described in detail with reference to FIG. 2. FIG. 2 is a block diagram showing a device for customizing a mail history according to a first embodiment of the present invention. Here, for the ease of understanding the present invention, a mail client of a mail system is used as an example of the device; however, the present invention is not limited to this, but can use any device which can customize a mail history as described hereinafter. In addition, the descriptions of well-known components and functions are omitted here, so as to avoid obscuring the present invention with unnecessary details; however, it is to be appreciated that this does not means that such well-known components and functions do not exist.

The first embodiment of the present invention is directed to a case where a user wants to refer to contents of a mail on a different branch of a same mail tree when replying to a current mail. Hereinafter, for the convenience of description, the present invention is described using an example of referring to a mail on another branch. However, the present invention is not limited to this, but can be extended to a case of referring to mails on many other branches, and such an extension is also applicable to other embodiments described later.

As shown in FIG. 2, a mail client 200 includes a generating means 201, a receiving means 202, an acquiring means 203, a merging means 204, and an inserting means 205.

When the user activates the mail client 200, the mail client 200 receives mails from other users in a well-known way, stores these mails in a memory (not shown), and generates a mail tree according to heritage relationships among these mails. Specifically, the generating means 201 of the mail client 200 generates the mail tree for all mails belonging to a same topic based on the heritage information included in the received mails, and arranges these mails and shows them to the user, for example, in a manner of changing the indentation distance gradually according to the heritage relationships among these mails. As described above, since the method for generating the mail tree is well known in the art, the description of the process for generating the mail tree is omitted here for simplicity.

Assume that the user is browsing a mail and wants to reply to the mail. Because the user finds that contents in another mail are useful, he also wants to refer to the contents of the other mails in a new mail as the reply. Therefore, the user selects the mail to be replied to and the mail to be referred to sequentially. For example, when the user clicks on the option of "Reply to all with history" on the interface of the current mail (i.e., the user selects the current mail), the mail client 200 may generate a user interface which is used to compose the new mail and has an operation button that can be used by the user to select the mail to be referred to, and then the user can select the mail to which he wants to refer by the operation button. Of course, the present invention is not limited to this, but can adopt any way that enables the user to input the mail to be replied to and the mail to be referred to, which is also applicable to other embodiments described later. It is to be appreciated that although, in the above description, the user selects the mail to be replied to first and then selects the mail to be referred to, this selection order is not limiting, and the user may also select the mail to be referred to first and then select the mail to be replied to, which is also applicable to other embodiments described later.

The receiving means 202 receives the user input indicating the mail to be replied to and the mail to be referred to which are selected by the user, and transmits to the acquiring means 203 information indicating the mail to be replied to and the mail to be referred to. The receiving means 202 may be, for example, a software module integrated in the mail client, and can be activated to receive the user input when the user selects to reply to the mail.

The acquiring means 203 reads the mail tree generated by the generating means 201, acquires mails on a path (hereinafter referred to as "main path") from a root mail to the mail to be replied to in the mail tree, and acquires mails on a path (hereinafter referred to as "included path") from the root mail to the mail to be referred to.

In particular, the acquiring means 203 includes a locating means 2031 and a searching means 2032. The locating means 2031 locates the mail to be replied to and the mail to be referred to in the mail tree based on the heritage information included in the mail to be replied to and the mail to be referred to, and acquires their branch information, the branch information including information reflecting heritage relationships between the mails and their parent mails and child mails, or information reflecting positions of the mails in the mail tree, such as information indicating the parent mails (i.e., parent nodes) and the child mails (i.e., child nodes) of the mails and so on.

The searching means 2032 traverses the main path and the included paths based on the mail to be replied to and the mail to be referred to which are located by the locating means 2031, so as to acquire mails on the paths and the branch information thereof. In particular, first, the searching means 2032 traverses the main path from the mail to be replied to until the root mail in a direction towards the root mail (root node) of the mail tree, so as to acquire all mails on the main path and the branch information thereof. Then, the searching means 2032 traverses the included path from the mail to be referred to until the root mail in a direction towards the root mail, so as to acquire all mails on the included path and the branch information thereof.

The merging means 204 is used to merge the mails on the main path and the included path to generate a mail history of the new mail as the reply. Specifically, the merging means 204 determines the relationships among the mails first based on the branch information of the respective mails acquired by the searching means 2032. For example, with respect to the mails on a same path, the merging means 204 determines that they possess heritage relationships (corresponding to parent nodes and child nodes in the mail tree), whereas with respect to the mails on different paths, the merging means 204 determines that they possess parallel relationships (corresponding to brother nodes in the mail tree). Then, the merging means 204 arranges all of the acquired mails on the two paths based on the determined relationships among the respective mails, so as to merge them into the mail history of the new mail. For example, the merging means 204 can arrange all mails on a same path in an order from a child node (i.e., child mail) to the root node (i.e., root mail) so as to indicate the temporal relationships among the mails, and indicates the heritage relationships among the mails in a manner of changing indentation distances of the mails gradually. Furthermore, since the mails on the main path and the mails on the included path possess the parallel relationships, the merging means 204 may arrange the mails on the main path and the mails on the included path in parallel at a same indentation distance to indicate the parallel relationships. Thereby, the merging means 204 generates the mail history of the new mail which is customized by the user by arranging the mails on the main path and the mails on the included path together, and may show to the user the relationships among the mails, such as the heritage relationships among the mails on a same branch or the parallel relationships among the mails on different branches, etc., in a specific arranging manner.

It is to be appreciated that the manner in which the merging means 204 merges the mails is not limited to the above-mentioned manner, instead, any manner that can clearly show the relationships among these mails may be used. For example, the merging means 204 can arrange the mails in an order from the root mail to a child mail, and/or indicate the heritage relationships and the parallel relationships among these mails by adding a specific sign.

The inserting means 205 is used to insert the merging result generated by the merging means 204 as the mail history into the new mail and display the mail history to the user. As such, the user is provided a new view including the customized mail history and can clearly grasp the related discussing history.

It should be notes that although, in the above description, the device for customizing a mail history according to the first embodiment of the invention is described as including a plurality of means, each of which performs a corresponding function, and thereby the history information of the mail to be replied to and the history information of the mail to be referred to are merged into the history information of the new mail, the present invention is not limited to this. In fact, it may be appreciated by those skilled in the art that some or all of the plurality of means can be combined to form one or more new means which can perform correspondingly combined functions. Alternatively, one or more of the plurality of means may be further divided into several sub-means which can perform the correspondingly divided functions. This is also applicable to other embodiments described later.

Figure 3:
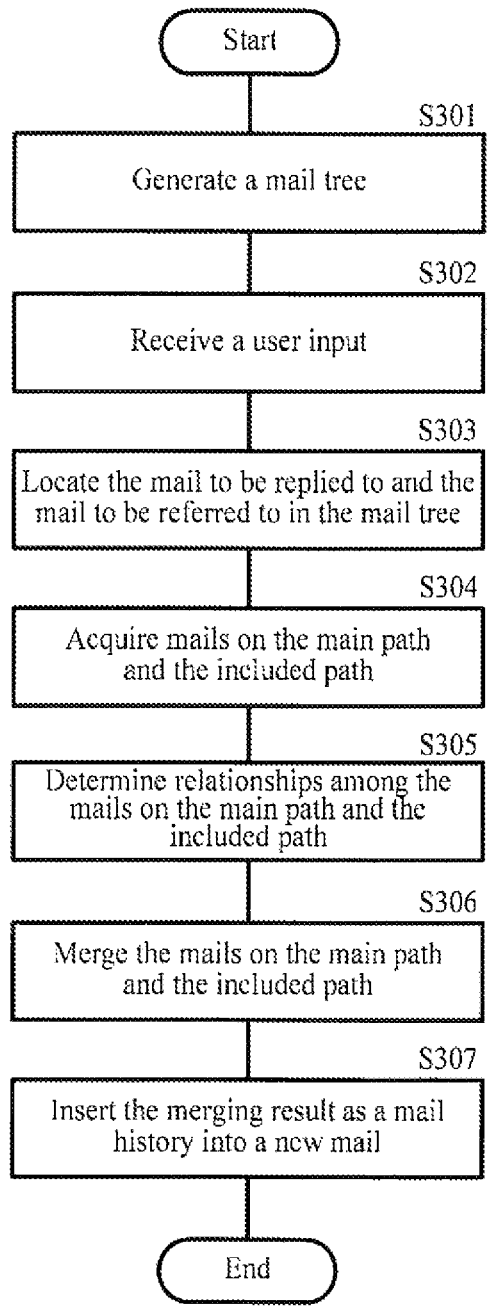
FIG. 3 is a flowchart showing a method for customizing a mail history according to the first embodiment of the present invention.

Hereinafter, a method for customizing a mail history performed by the above mail client will be described with reference to FIGS. 2 and 3. FIG. 3 is a flowchart showing the method for customizing a mail history according to the first embodiment of the present invention.

When activated, the mail client 200 receives mails transmitted by other users to the present user in a well known way, and stores these mails in a memory (not shown). As shown in FIG. 3, in step S301, the generating means 201 of the mail client 200 generates a mail tree for mails belonging to a same topic based on the heritage information in the respective received mails, and displays these mails to the user in the form of a tree view. The heritage information is information which is added into the received mails by other mail clients when they transmit these mails and reflects replying or forwarding relationships, which is well known in the art. As described above, since the method for the generating means 201 to generate the mail tree is well known, the description thereof is omitted here for simplicity.

When the user is browsing a mail in the mail client, as described above, the user selects a mail to be replied to and a mail to be referred to, for example, by clicking on the option of "Reply to all with history" on the interface of the current mail, and selecting the mail to be referred to via a generated user interface which is used to compose the new mail and has an operation button that can be used by the user to select the mail to be referred to. At the same time, in step S302, the receiving means 202 receives the user input indicating the mail to be replied to and the mail to be referred to which are selected by the user, and then, the receiving means 202 transmits to the acquiring means 203 information indicating the mail to be replied to and the mail to be referred to.

Next, in step S303, the locating means 2031 of the acquiring means 203 reads the mail tree generated in the generating means 201, locates the mail to be replied to and the mail to be referred to in the mail tree, and acquires branch information of the mails. The branch information includes, for example, information reflecting heritage relationships between the mails and their parent mails (corresponding to parent nodes in the mail tree), or information reflecting positions of the mails in the mail tree, such as information indicating the parent mails (i.e., parent nodes) and the child mails (i.e., child nodes) of the mails, etc. Then, the locating means 2031 provides the information to the searching means 2032.

Then, in step S304, the searching means 2032 traverses the main path and the included path based on the mail to be replied to and the mail to be referred to which are located by the locating means 2031, so as to acquire mails on the paths. In particular, the searching means 2032 traverses the main path from the mail to be replied to until the root mail in a direction towards the root mail (or the root node) of the mail tree, so as to acquire all mails on the main path and the branch information thereof. Then, the searching means 2032 traverses the included path from the mail to be referred to until the root mail in a direction towards the root mail, so as to acquire all mails on the included path and the branch information thereof. Subsequently, the searching means 2032 provides the acquired mails and the branch information thereof to the merging means 204 of the mail client 200.

Next, in step S305, the merging means 204 receives the acquiring result from the searching means 2032, and determines the relationships among these mails based on the branch information of the respective mails. For example, as described above, the mails on a same path can be determined as possessing heritage relationships, whereas the mails on two different paths can be determined as possessing parallel relationships.

Then, in step S306, the merging means 204 merges all of the acquired mails on the main path and the included paths, based on the determined relationships among the respective mails (including the relationships among the mails on a same path and the relationships among the mails on different paths). For example, the merging means 204 may arrange all mails on a same path in an order from a child mail to the root mail so as to indicate the temporal relationships among the mails, indicate the heritage relationships among the mails in a manner of changing indentation distances of the mails gradually, and indicate the parallel relationships among mails on two different paths (for example, the mail to be replied to and the mail to be referred to) by using a same indentation distance. Thereby, the merging means 204 arranges the mails on main path and the mails on included paths together in a specific order and manner, so as to form a mail history of a new mail and meanwhile show the relationships among these mails to the user clearly. As described above, it is to be appreciated that the present invention is not limited to the above-mentioned specific arranging manner, but can adopt any arranging manner which can show the mails and their relationships clearly.

Next, in step S307, the inserting means 205 inserts the merging result generated by the merging means 204 as the mail history into the new mail and displays this mail history to the user.

As described above, it is to be appreciated that, although it is described in the above description that the mails on the main path and one included path are emerged into the mail history of the new mail, the present invention is not limited to this, and those skilled in the art can easily extend the technical solutions of the present embodiment to emerge the mails on the main path and a plurality of included paths into the mail history of the new mail.

Furthermore, in the device and the method for customizing a mail history according to the first embodiment of the present invention, when a user selects the mail to be replied to and the mail to be referred to, the searching means 2032 traverses the main path from the root mail of the mail tree to the mail to be replied to and the included path from the root mail to the mail to be referred to, so as to acquire the mails on the two paths, and then the merging means 204 merges these mails to form the mail history of the new mail. That is, the merged mails do not include child mails (corresponding to child nodes in the mail tree) of the mail to be replied to and the mail to be referred to. However, the present invention is not limited to this. In a variation of the first embodiment, the child mails of the mail to be replied to and the mail to be referred to may also be included in the mail history. In particular, after the locating means 2031 locates the mail to be replied to and the mail to be referred to in the mail tree, the searching means 2032 may traverse one or more paths from the root mail to one or more child mails of the mail to be replied to (i.e., one or more child nodes of the node corresponding to the mail to be replied to in the mail tree) to acquire all mails on the paths and the branch information thereof, and then traverse one or more paths from the root mail to one or more child mails of the mail to be referred to (i.e., one or more child nodes of the node corresponding to the mail to be referred to) to acquire all mails on the paths and the branch information thereof. Then, the merging means 204 may merge these mails in the same way as described above to generate the customized mail history.

For example, referring to FIG. 1, it is assumed that the mail selected by the user to be replied to corresponds to a node 104 in the mail tree, and the mail selected by the user to be referred to corresponds to a node 113. Then, in the first embodiment, the mails on the main path from the root mail to the mail to be replied to are mail nodes 101, 102, 103 and 104, the mails on the included path from the root mail to the mail to be referred to are mail nodes 101, 102, 112 and 113, and the merging means 204 merges these mails into the history of the new mail as the reply. In the variation of the first embodiment, the mails on the paths from the root mail to the child mails of the mail to be replied to can be, for example, mails 101, 102, 103, 104, 105, 106, 107 and 108, the mails on the paths from the root mail to the child mails of the mail to be referred to can be, for example, mails 101, 102, 112, 113, 114 and 115, and the merging means 204 can merge these mails into the history of the new mail. Of course, in the variation of the first embodiment, the merged child mails of the mail to be replied to and the mail to be referred to may also be one or more of all child mails thereof.

With the device and the method for customizing a mail history according to the first embodiment of the present invention, when replying to a mail, the user may conveniently refer to contents of a mail on a different branch of the same mail tree, so as to customize a mail history of a new mail as the reply. However, since the merged mails on different paths include identical mails, for example, the merged mails on the main path and the included path both include at least the root mail, these identical mails will be repeatedly displayed in the customized mail history, which causes redundant information to appear in the merging result. In order to solve this problem, an improvement is made to the first embodiment of the present invention.

Figure 4:
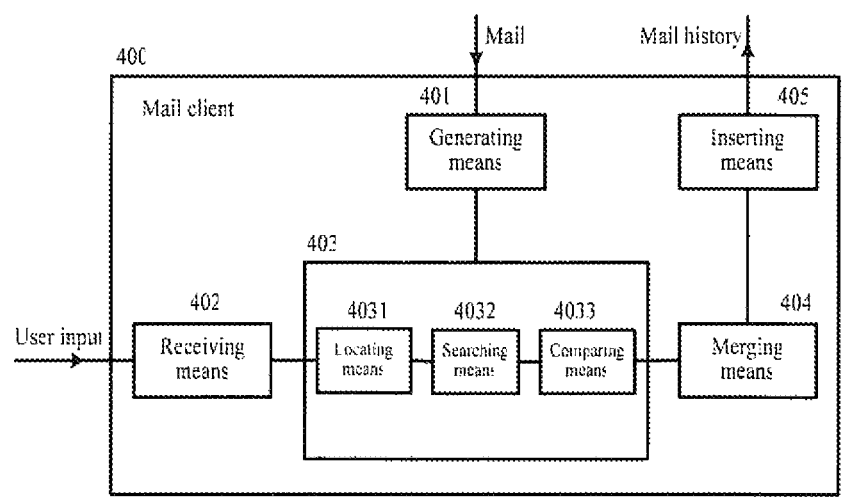
FIG. 4 is a block diagram showing a device for customizing a mail history according to a second embodiment of the present invention.

Hereinafter, a device for customizing a mail history according to a second embodiment of the present invention will be described in detail with reference to FIG. 4. FIG. 4 is a block diagram showing a device for customizing a mail history according to a second embodiment of the present invention. Likewise, a mail client is used as an example of the device, but the device is not limited to a mail client A mail client 400 shown in FIG. 4 includes a generating means 401, a receiving means 402, an acquiring means 403, a merging means 404 and an inserting means 405. The generating means 401, the receiving means 402 and the inserting means 405 are substantially the same as the generating means 201, the receiving means 202 and the inserting means 205 of the mail client 200 according to the first embodiment of the present invention shown in FIG. 2, thus the detailed description of the same components is omitted hereinafter.

As described with regard to the first embodiment, the generating means 401 generates a mail tree based on mails received by the mail client 400, wherein all mails belonging to a same topic constitutes one mail tree. The receiving means 402 receives a user input indicating a mail to be replied to and a mail to be referred to, and transmits it to the acquiring means 403, wherein the mail to be replied to and the mail to be referred to are located on different branches of the mail tree.

The acquiring means 403 reads the generated mail tree, and acquires mails on a main path from a root mail of the mail tree to the mail to be replied to and mails on an included path from the root mail to the mail to be referred to. In particular, the acquiring means 403 includes a locating means 4031, a searching means 4032, and a comparing means 4033.

The locating means 4031 is substantially the same as the locating means 2031 according to the first embodiment, and it reads the generated mail tree from the generating means 401, locates in the mail tree the mail to be replied to and the mail to be referred to which are selected by the user, and acquires branch information of these mails. The branch information includes, for example, information reflecting heritage relationships between the mails and their parent mails, or information reflecting positions of the mails in the mail tree, such as information indicating the parent mails and the child mails of the mails and so on.

The searching means 4032 is substantially the same as the searching means 2032 according to the first embodiment, and it traverses the main path and the included path based on the branch information of the mail to be replied to and the mail to be referred to which is acquired by the locating means 4031, so as to acquire mails on the paths and the branch information thereof.

The comparing means 4033 compares the mails on the main path and the mails on the included path which are acquired by the searching means 4032 to find identical mails in these mails, and deletes the identical mails from the acquired mails on the included path to prevent them from appearing in the final merging result repeatedly. Since the method for comparing the mails to determine whether they are identical and the method for comparing the mails on different paths of the mail tree to find identical mails therein are well known in the art, the detail descriptions thereof are omitted here for conciseness.

Next, in a similar way to that in the first embodiment of the present invention, the merging means 404 merges the acquired mails on the main path and the mails on the included path which are subjected to the above deleting processing into a mail history of a new mail. Then, the inserting means 405 inserts the generated mail history into the new mail, and displays it to the user.

Referring to FIG. 1 again, it is assumed that the mail to be replied to and the mail to be referred to which are selected by the user respectively correspond to a node 104 and a node 113 in the mail tree, then the searching means 4032 according to the second embodiment of the present invention acquires mails 101, 102, 103 and 104 on the main path and mails 101, 102, 112 and 113 on the included path. The comparing means 4033 compares the mails on the two paths, finds identical mails 101 and 102, and deletes the mails 101 and 102 from the mails on the included path. Then, the merging means 404 merges the mails 101, 102, 103 and 104 on the main path and the mails 112 and 113 on the included path which are subjected to the deleting processing into the mail history of the new mail. The repetitious mails 101 and 102 are prevented from appearing in the merging result repeatedly, since they have been deleted.

Figure 5:
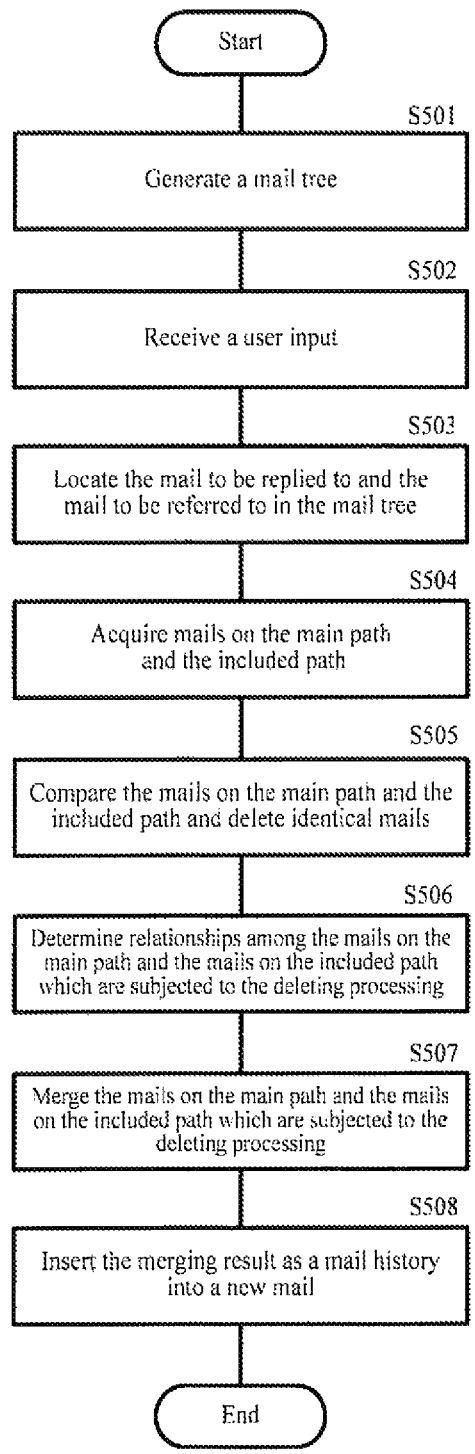
FIG. 5 is a flowchart showing a method for customizing a mail history according to the second embodiment of the present invention.

Hereinafter, a method performed by the device for customizing a mail history according to the second embodiment of the present invention will be described with reference to FIGS. 4 and 5. FIG. 5 is a flowchart showing the method for customizing a mail history according to the second embodiment of the present invention. Steps S501, S502, S503, S504 and S508 of the method are respectively the same as the steps S301, S302, S303, S304 and S307 of the method according to the first embodiment of the present invention shown in FIG. 3, and the detailed description of the same steps is omitted here for simplicity.

In step S501, the generating means 401 generates a mail tree based on mails which belong to a same topic and are received by the mail client 400. In step S502, the receiving means 402 receives a user input indicating a mail to be replied to and a mail to be referred to which are selected by the user. In step S503, the locating means 4031 locates the mail to be replied to and the mails to be referred to in the mail tree, and acquires branch information thereof. In step S504, the searching means 4032 traverses a main path from a root mail to the mail to be replied to and an included path from the root mail to the mail to be referred to, so as to acquire mails on the two paths and the branch information thereof, and then provides the acquiring result to the comparing means 4033.

In step S505, the comparing means 4033 compares the mails on the main path and the mails on the included path which are acquired by the searching means 4032, so as to find identical mails in these mails, and deletes the identical mails from the acquired mails on the included path.

Next, in step S506, the merging means 404 receives the mails on the main path, the mails on the included path which are subjected to the deleting processing, and the branch information thereof from the comparing means 4033, and determines relationships among the mails, such as heritage relationships, parallel relationships or the like, based on the branch information.

Then, in step S507, the merging means 404 merges the mails on the main path and the mails on the included path which are subjected to the deleting processing into a mail history of a new mail based on the determined relationships, and provides the merging result to the inserting means 405. Here, the merging means 404 may merge the mails in a same way as that in the first embodiment.

Finally, in step S508, the inserting means 405 inserts the merging result generated by the merging means 404 as the mail history into the new mail, and displays the mail history to the user.

Likewise, it is to be appreciated that, in a variation of the second embodiment, the main path can be selected as one or more paths from the root mail of the mail tree to one or more child mails of the mail to be replied to, and the included path can be selected as one or more paths from the root mail to one or more child mails of the mail to be referred to. At this time, the merging result (i.e., the customized mail history) will include one or more child mails of the mail to be replied to and the mail to be referred to.

With the device and the method for customizing a mail history according to the second embodiment of the present invention, when replying to a mail, the user may refer to contents of a mail on another branch to customize the mail history, and meanwhile, redundant information can be prevented from being generated in the customized mail history.

Hereinafter, an example of customizing a mail history using the device and the method according to the second embodiment of the present invention will be described.

Figure 6:
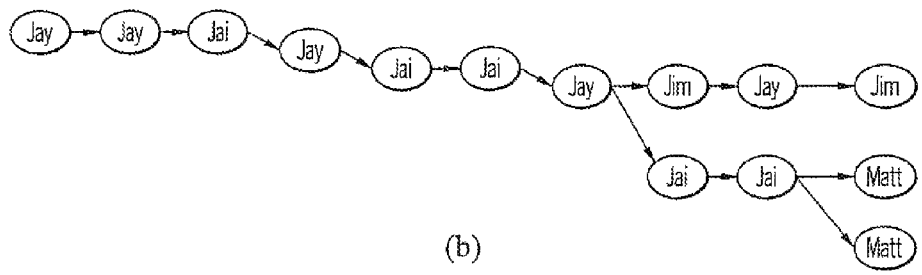
FIGS. 6a and 6b schematically show mails received by a mail client supporting a tree view and a generated mail tree, respectively.

FIG. 6 schematically shows mails received by a mail client supporting a mail tree view and a generated mail tree, wherein FIG. 6(a) shows the mails received by the mail client, and FIG. 6(b) shows the mail tree generated for the mails, which has a plurality of branches.

Figure 7:
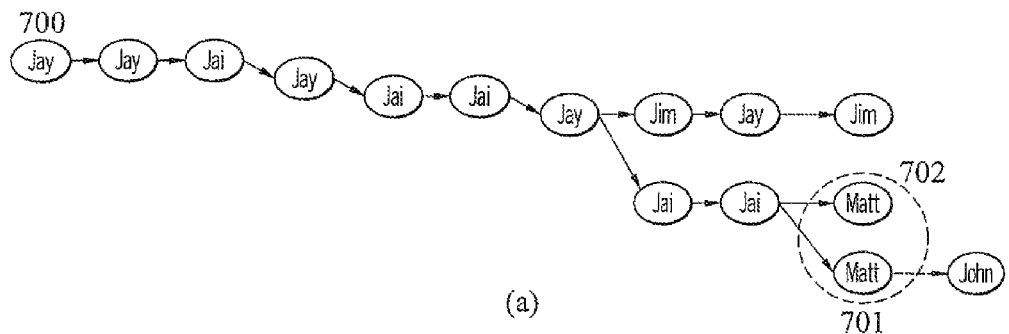
FIGS. 7a and 7b show a selection of a user with respect to the mails shown in FIG. 6 and a mail history obtained by using the device and the method for customizing a mail history according to the second embodiment of the present invention, respectively.

FIG. 7 shows a selection of a user with respect to the mails shown in FIG. 6 and a mail history obtained by using the device and the method for customizing a mail history according to the second embodiment of the present invention. In FIG. 7(a), the nodes surrounded by a circle represent a mail 701 to be replied to and a mail 702 to be referred to which are selected by a user John, respectively. FIG. 7(b) shows the customized mail history. As shown in FIG. 7(b), in this example, a main path is a path from the mail 701 to a root mail 700, and an included path is a path from the mail 702 to the root mail 700. Since the main path and the included path are partly overlapped, after the comparing and deleting processing of the comparing means, the mails on the main path include all mails on the path from the mail 701 to the root mail 700, and the mails on the included path only include the mail 702. In this example, the merging means arranges the mails on the main path in an order from a child mail to the root mail and in a manner of increasing indentation distances of the mails gradually to indicate the heritage relationships among them, and arranges the mail 701 and the mail 702 located on two branches respectively at a same indentation distance to indicate the parallel relationship between them, so that the relationships among the respective mails in the customized mail history are clearly shown to the user.

In the first and second embodiments of the present invention, the user manually selects the mail to be replied to and the mail to be referred to, and the mail client automatically generates the mail history of the new mail as the reply to based on the selection. When the user wants to refer to a plurality of mails when the user replies to a mail, the user can select the mails one by one, and then the mail client combines history information of the mail to be replied to and history information of the mails to be referred to, so as to form a mail history of a new mail. However, when the user wants to refer to mails on all the other branches of the mail tree, although the user can still select the mails to be referred to one by one, this is quite troublesome and time-consuming. Therefore, a device and a method for the customizing a mail history according to a third embodiment of the present invention is proposed.

The device for customizing a mail history according to the third embodiment of the present invention is the same in structure as the device for customizing a mail history according to the second embodiment of the present invention shown in FIG. 4, and the difference between them only lies in that functions performed by respective means are different. The block diagram of the device is not shown repeatedly for conciseness.

Figure 8:
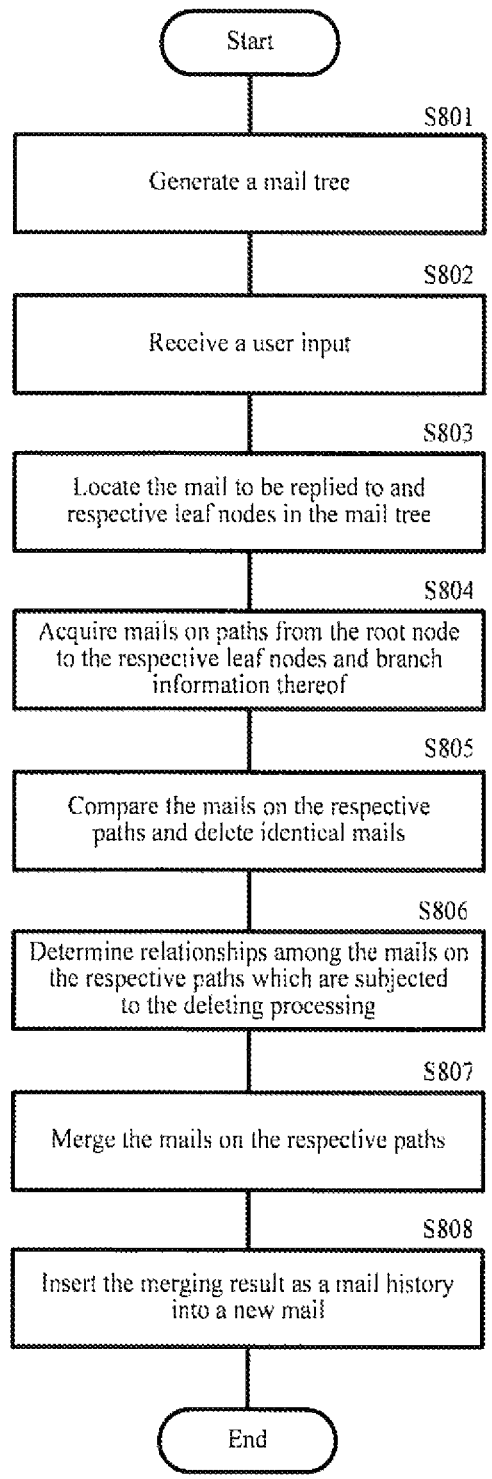
FIG. 8 is a flowchart showing a method for customizing a mail history according to a third embodiment of the present invention.

Hereinafter, a method for customizing a mail history according to the third embodiment of the present invention will be described with reference to FIG. 4 and FIG. 8. FIG. 8 is a flowchart showing the method for customizing a mail history according to the third embodiment of the present invention.

In the third embodiment of the present invention, for example, a user may select to reply to a current mail and include all mails in the mail tree as a mail history of a new mail by clicking on the option of "Include all mails as mail history and reply to all" provided on the interface of the current mail.

As shown in FIG. 8, in step S801, the generating means 401 generates a mail tree for mails belonging to a same topic which are received by the mail client, and as is well known in the art, each of the mails includes information reflecting relationships between the mail and other mails, for example, heritage relationships. Then, in step S802, the user selects a mail to be replied to and selects to include all of the mails in the mail tree as the mail history of the new mail as described above, and the receiving means 402 receives the selection of the user.

In step S503, the locating means 4031 locates the mail to be replied to in the mail tree, traverses the mail tree to locate respective leaf mails (i.e., leaf nodes) in the mail tree, and acquires branch information of the mails. For example, the locating means may first traverse from the mail to be replied to to child mails thereof and subsequently returns to the mail to be replied to, then traverse from the mail to its brother mails and their child mails, and finally traverse to the root mail, thereby traversing the whole tree. It should be noted that the above-mentioned traversing order is merely exemplary, and in fact, the present invention can adopt any traversing order in which the whole tree can be traversed.

Then, in step S804, the searching means 4032 traverses paths from the root mail to the respective leaf mails to acquire all mails on these paths and branch information of these mails.

In step S805, the comparing means 4033 of the acquiring means 403 compares the mails on the respective paths so as to find identical mails therein, and deletes one of two groups of the identical mails. For example, the comparing means 4033 may sequentially compare the respective branches in an order from a rightmost branch to a leftmost branch of the mail tree so as to determine the identical mails therein, and then delete the identical mails from the acquired mails on a right branch of two branches participating in the comparison.

Next, the merging means 404 determines relationships among the mails on the respective paths which are subjected to the above deleting processing based on the branch information of the mails which is acquired by the searching means 4032 in step S806, and merges the mails on the respective paths which are provided from the comparing means 4033 into the mail history of the new mail based on the relationships in step S807. For example, the merging means 404 can arrange the mails on a same path in an order from a child mail to a root mail and in a manner of increasing indentation distances thereof gradually, and arranges the mails on different paths in parallel, as shown in FIG. 7(*b*). However, other arranging manners may also be adopted.

Finally, in step S808, the inserting means 405 inserts the result of the merging as the mail history into the new mail, and displays the mail history to the user.

Figure 9:
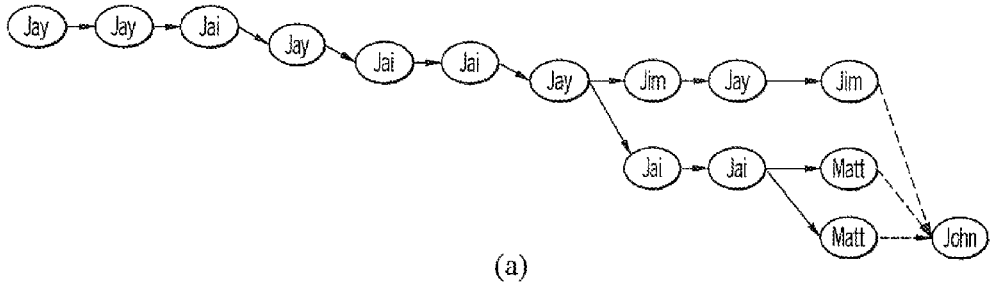
FIGS. 9a and 9b show a selection of a user with respect to the mails shown in FIG. 6 and a mail history obtained by using the device and the method for customizing a mail history according to the third embodiment of the present invention, respectively.

FIG. 9 shows a selection of a user with respect to the mails shown in FIG. 6 and a mail history obtained by using the device and the method for customizing a mail history according to the third embodiment of the present invention, wherein, FIG. 9(*a*) represents that the user John selects to include all mails in the mail tree as the mail history, and FIG. 9(*b*) shows an obtained mail history.

Cases where a mail to be replied to and a mail to be referred to are located on different branches of a same mail tree have been described hereinbefore. However, the present invention can also be applied to a case where a mail to be replied to and a mail to be referred to are located on different mail trees, i.e., a case where a mail to be replied to and a mail to be referred to do not belong to a same topic. Hereinafter, a device and a method for customizing a mail history according to a fourth embodiment of the present invention will be described.

The device for customizing a mail history according to the fourth embodiment of the present invention is the same in structure as the device according to the first embodiment of the present invention shown in FIG. 2, and the difference between them merely lies in that functions performed by respective means are different. The block diagram of the device is not shown repeatedly for conciseness.

Figure 10:
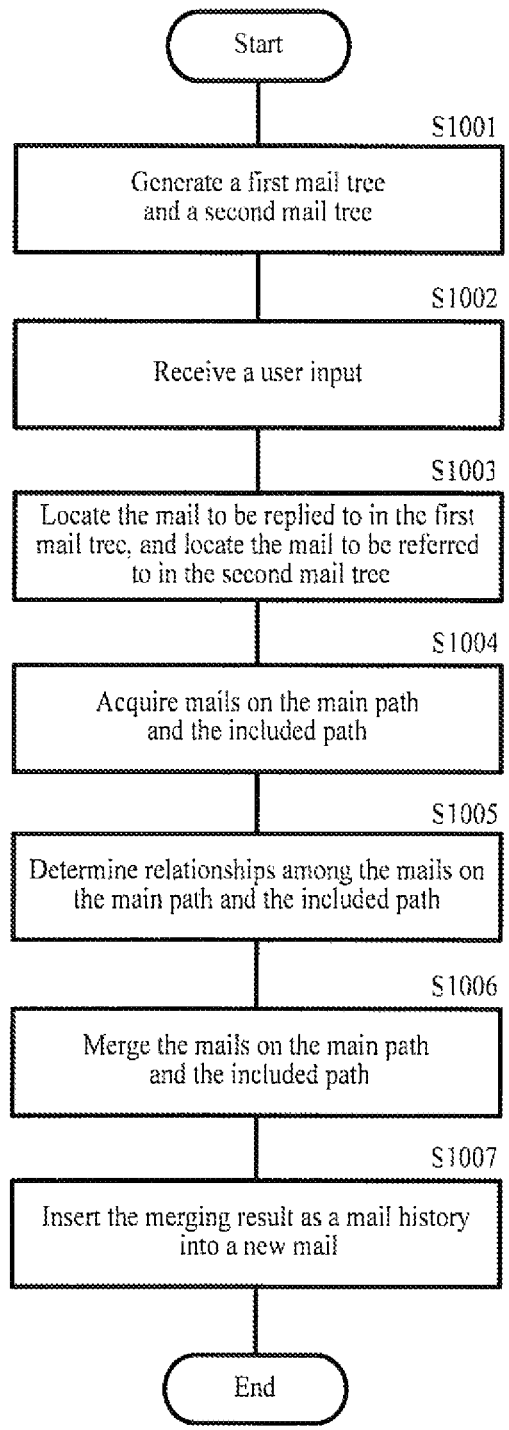
FIG. 10 is a flowchart showing a method for customizing a mail history according to a fourth embodiment of the present invention.

Hereinafter, the method for customizing a mail history according to the fourth embodiment of the present invention will be described with reference to FIG. 2 and FIG. 10. FIG. 10 is a flowchart showing the method for customizing a mail history according to the fourth embodiment of the present invention, wherein steps S1001, S1002, S1003 and S1007 are similar to the steps of S301, S302, S303 and S307 of the method according to the first embodiment of the present invention shown in FIG. 3, and thus the detailed description of these steps is omitted.

As shown in FIG. 10, in step S1001, the generating means 201 generates a mail tree for mails received by the mail client, wherein the mails belonging to a same topic are located on a same mail tree, whereas the mails belonging to different topics are located on different mail trees. In step S1002, the receiving means 202 receives a user input indicating a mail to be replied to in a first mail tree and a mail to be referred to in a second mail tree which are selected by the user. In step S1003, the locating means 2031 of the acquiring means 203 locates the mail to be replied to in the first mail tree, locates the mail to be referred to in the second mail tree, and acquires branch information of the mails. In step S1004, the searching means 2032 traverses a main path from a root mail of the first mail tree to the mail to be replied to and an included path from a root mail of the second mail tree to the mail to be referred to, so as to acquire all mails on the paths and the branch information thereof.

Next, in step S1005, the merging means 204 determines relationships among the mails based on the branch information acquired by the searching means 2032. At this time, since the mail to be replied to and the mail to be referred to are located on different mail trees, the merging means 204 determines that the mails on the main path and the mails on the included path respectively possess heritage relationships, and determines that the relationship between the mails on the main path and the mails on the included path is a parallel relationship. Then, in step S1006, the merging means 204 merges the acquired mails on the main path and the included path in a similar way to that described above based on the determined relationships.

In step S1007, the inserting means 205 inserts the merging result as a mail history into a new mail.

The devices and methods for customizing a mail history according to the present invention are described above. With the devices and methods, when replying to a mail, a user may directly refer to a mail on another branch of a same mail tree or a mail on a different mail tree (i.e., a mail belonging to a different topic), without the necessity of performing copying and pasting operations or troublesome forwarding operations as in the conventional art, thereby improving the efficiency of a mail system.

Alternative embodiments of the present invention may further comprise computer readable cods on a computer readable medium. The computer readable medium may include a computer readable recording medium. The computer readable recording medium is any data storage apparatus that can store data readable by a computer system later. Examples of the computer readable recording medium include a magnetic storage medium, such as a read-only memory (ROM), a random-access memory (RAM), a CD-ROM, a magnetic tape, a floppy disk and a hard disk, and an optical storage apparatus, such as a CD (compact disk) and a DVD (digital versatile disk). The computer readable recording medium may also be distributed in network-coupled computer systems so that the computer readable codes are stored and executed in a distributed way. Furthermore, programmers in the art to which the present invention pertains can easily construe a functional program, a code and a code segment for implementing the present invention.

Although some exemplary embodiments of the present invention have been shown and described, it is to be appreciated by those skilled in the art that various changes in form and detail may be made to these exemplary embodiments without departing from the scope and spirit of the invention as defined in the following claims and the equivalents thereof.

What is claimed is:

1. A method for customizing a mail history, comprising:
   generating, using a computer hardware device, a mail tree composed of all received mails belonging to a same topic;
   receiving, using the computer hardware device, a user input indicating a mail to be replied to and a mail to be referred to which are selected by a user to be included in one message from the user, the mail to be replied to and the mail to be referred to sharing a root mail and being located on different branches of the mail tree;
   acquiring, using the computer hardware device, a first plurality of mails on a first path from the root mail of the mail tree to a child mail of the mail to be replied to, and a second plurality of mails on a second path from the root mail to a child mail of the mail to be referred to; and
   merging, using the computer hardware device, the first plurality of mails and the second plurality of mails to generate a merging result as the mail history included in the one message.

2. The method as claimed in claim 1, wherein all mails belonging to the same topic are received by a mail client.

3. The method as claimed in claim 1, wherein the acquiring further comprises:
   locating the mail to be replied to and the mail to be referred to in the mail tree;
   traversing a part of the first path between the mail to be replied to and the root mail, so as to acquire all mails between the mail to be replied to and the root mail as the first plurality of mails; and
   traversing a part of the second path between the mail to be referred to and the root mail, so as to acquire all mails between the mail to be referred to and the root mail as the second plurality of mails.

4. The method as claimed in claim 1, wherein the acquiring further comprises:
   locating the mail to be replied to and the mail to be referred to in the mail tree;
   traversing a part of the first path between the mail to be replied to and the root mail, so as to acquire all mails between the mail to be replied to and the root mail as the first plurality of mails;
   traversing a part of the second path between the mail to be referred to and the root mail, so as to acquire all mails between the mail to be referred to and the root mail as a third plurality of mails;
   comparing the first plurality of mails and the third plurality of mails to find identical mails therein; and
   deleting the identical mails from the third plurality of mails to obtain the second plurality of mails.

5. The method as claimed in claim 1, wherein the acquiring further comprises:
   locating the mail to be replied to and the mail to be referred to in the mail tree;
   traversing the first path to acquire all mails thereon as the first plurality of mails; and
   traversing the second path to acquire all mails thereon as the second plurality of mails.

6. The method as claimed in claim 1, wherein the acquiring further comprises:
   locating the mail to be replied to and the mail to be referred to in the mail tree;
   traversing the first path to acquire all mails thereon as the first plurality of mails;
   traversing the second path to acquire all mails thereon as a third plurality of mails;
   comparing the first plurality of mails and the third plurality of mails to find identical mails therein; and
   deleting the identical mails from the third plurality of mails to obtain the second plurality of mails.

7. The method as claimed in claim 1, wherein the merging further comprises:
   arranging respective mails in the first plurality of mails and respective mails in the second plurality of mails in an order from a child mail to the root mail and in a manner of changing indentation distances thereof gradually; and
   arranging the mail to be replied to and the mail to be referred to in parallel, so as to merge the mails.

8. The method as claimed in claim 1, further comprising:
   inserting the merging result as the mail history into a new mail as a reply.

9. A device for customizing a mail history, comprising:
   generating means for generating a mail tree composed of all received mails belonging to a same topic;
   receiving means for receiving a user input indicating a mail to be replied to and a mail to be referred to which are selected by a user to be included in one message from the user, the mail to be replied to and the mail to be referred to sharing a root mail and being located on different branches of the mail tree;
   acquiring means for acquiring a first plurality of mails on a first path from the root mail of the mail tree to a child mail of the mail to be replied to, and a second plurality of mails on a second path from the root mail to a child mail of the mail to be referred to; and
   merging means for merging the first plurality of mails and the second plurality of mails to generate a merging result as the mail history included in the one message.

10. The device as claimed in claim 9, wherein the device is a mail client, and the all mails belonging to the same topic are received by the mail client.

11. The device as claimed in claim 9, wherein the acquiring means further comprises:
   locating means for locating the mail to be replied to and the mail to be referred to in the mail tree; and
   searching means for traversing a part of the first path between the mail to be replied to and the root mail, so as to acquire all mails between the mail to be replied to and the root mail as the first plurality of mails, and for traversing a part of the second path between the mail to be referred to and the root mail, so as to acquire all mails between the mail to be referred to and the root mail as the second plurality of mails.

12. The device as claimed in claim 9, wherein the acquiring means further comprises:
   locating means for locating the mail to be replied to and the mail to be referred to in the mail tree;
   searching means for traversing a part of the first path between the mail to be replied to and the root mail, so as to acquire all mails between the mail to be replied to and the root mail as the first plurality of mails, and for traversing a part of the second path between the mail to be referred to and the root mail, so as to acquire all mails between the mail to be referred to and the root mail as a third plurality of mails; and
   comparing means for comparing the first plurality of mails and the third plurality of mails to find identical mails therein, and for deleting the identical mails from the third plurality of mails to obtain the second plurality of mails.

13. The device as claimed in claim 9, wherein the acquiring means further comprises:
   locating means for locating the mail to be replied to and the mail to be referred to in the mail tree; and
   searching means for traversing the first path to acquire all mails thereon as the first plurality of mails, and for traversing the second path to acquire all mails thereon as the second plurality of mails.

14. The device as claimed in claim 9, wherein the acquiring means further comprises:
   locating means for locating the mail to be replied to and the mail to be referred to in the mail tree;
   searching means for traversing the first path to acquire all mails thereon as the first plurality of mails, and for traversing the second path to acquire all mails thereon as a third plurality of mails; and
   comparing means for comparing the first plurality of mails and the third plurality of mails to find identical mails therein, and for deleting the identical mails from the third plurality of mails to obtain the second plurality of mails.

15. The device as claimed in claim 9, wherein the merging means respectively arranges respective mails in the first plurality of mails and respective mails in the second plurality of mails in an order from a child mail to the root mail and in a manner of changing indentation distances thereof gradually, and arranges the mail to be replied to and the mail to be referred to in parallel, so as to merge the mails.

16. The device as claimed in claim 9, further comprising:

inserting means for inserting the merging result as the mail history into a new mail as a reply.

17. A computer program product stored on a computer readable storage medium for customizing a mail history, when the program is executed on a computer, the program product comprising program code for:

generating a first mail tree composed of all received mails belonging to a first topic, and generating a second mail tree composed of all received mails belonging to a second topic;

receiving a user input indicating a mail to be replied to which is selected by the user to be included in one message from the user in the first mail tree and a mail to be referred to which is selected by the user in the second mail tree;

acquiring a first plurality of mails on a first path from a root mail of the first mail tree to a child mail of the mail to be replied to in the first mail tree, and acquiring a second plurality of mails on a second path from a root mail of the second mail tree to a child mail of the mail to be referred to in the second mail tree; and merging the first plurality of mails and the second plurality of mails to generate a merging result as the mail history included in the one message.

18. The computer program product as claimed in claim 17, wherein all mails belonging to the first topic and all mails belonging to the second topic are received by a mail client.

19. The computer program product as claimed in claim 17, further comprising:

inserting the merging result as the mail history into a new mail as a reply.

* * * * *